(12) United States Patent
Pelman et al.

(10) Patent No.: US 11,872,771 B2
(45) Date of Patent: Jan. 16, 2024

(54) NON-STANDARD RESIN-INFUSED FIBER BUNDLES

(71) Applicant: Arris Composites Inc., Berkeley, CA (US)

(72) Inventors: Todd Pelman, Moss Beach, CA (US); Dylan Harper, Berkeley, CA (US); Christopher Bender, Berkeley, CA (US); Riley Reese, Oakland, CA (US); J. Scott Perkins, Oakland, CA (US)

(73) Assignee: ARRIS COMPOSITES INC., Berkeley, CA (US)

( * ) Notice: Subject to any disclaimer, the term of this patent is extended or adjusted under 35 U.S.C. 154(b) by 529 days.

(21) Appl. No.: 17/027,396

(22) Filed: Sep. 21, 2020

(65) Prior Publication Data

US 2021/0086402 A1 Mar. 25, 2021

Related U.S. Application Data

(60) Provisional application No. 62/902,513, filed on Sep. 19, 2019.

(51) Int. Cl.
| | |
|---|---|
| *B29C 70/00* | (2006.01) |
| *B29B 11/00* | (2006.01) |
| *B29C 70/20* | (2006.01) |
| *B29B 11/16* | (2006.01) |
| *B29B 11/06* | (2006.01) |
| *B29B 11/04* | (2006.01) |

(Continued)

(52) U.S. Cl.
CPC ............ *B29C 70/205* (2013.01); *B29B 11/04* (2013.01); *B29B 11/06* (2013.01); *B29B 11/16* (2013.01); *B29C 70/30* (2013.01); *B29K 2105/0881* (2013.01)

(58) Field of Classification Search
CPC ....... B29C 70/00; B29C 70/20; B29C 70/205; B29C 70/30; B32B 11/00; B32B 11/04; B32B 11/06; B32B 11/10; B32B 11/16
See application file for complete search history.

(56) References Cited

U.S. PATENT DOCUMENTS

| | | | |
|---|---|---|---|
| 2020/0114596 A1* | 4/2020 | Davidson | ............... B29C 65/02 |
| 2020/0130297 A1* | 4/2020 | Escowitz | ............... G06F 30/17 |

OTHER PUBLICATIONS

Fixture and Method for Use in a Molding Process, U.S. Appl. No. 16/877,236.

(Continued)

*Primary Examiner* — Jacob T Minskey
*Assistant Examiner* — Matthew Hoover
(74) *Attorney, Agent, or Firm* — Wayne S. Breyer; Kaplan Breyer Schwarz, LLP (57) ABSTRACT

Non-standard, resin-infused fiber bundle includes localized regions of fibers having a sub-nominal amount of polymer resin positioned along its length. These regions function as "bending regions," where the non-standard resin-infused fiber bundle can be readily deformed by virtue of the reduced amount of resin. The bending regions segregate the non-standard resin-infused fiber bundle into what is, effectively, discrete (smaller) segments of (standard) resin-infused fiber bundle. The ability to easily manipulate the non-standard, resin-infused fiber bundle via the bending regions is useful for creating fiber-bundle-based preforms, and preform charges (assemblages of fiber-bundle-based preforms).

17 Claims, 6 Drawing Sheets

(51) Int. Cl.
 *B29C 70/30* (2006.01)
 *B29K 105/08* (2006.01)

(56) References Cited

OTHER PUBLICATIONS

Simultaneous Topology and Fiber Alignment Optimization for Anisotropic Materials, U.S. Appl. No. 16/811,537.

* cited by examiner

FIG. 1

FIG. 6

NON-STANDARD RESIN-INFUSED FIBER BUNDLES

STATEMENT OF RELATED CASES

This specification claims priority to U.S. Patent Application Ser. No. 62/902,513 filed Sep. 19, 2019, and which is incorporated by reference herein.

FIELD OF THE INVENTION

The present invention relates to additive molding of fiber-composite materials.

BACKGROUND

There is a demand for high-volume, low-cost parts that are made of fiber-composite materials, due to the superior material attributes (e.g., high strength with low weight, etc.) thereof.

Fiber composites include two primary components: a matrix material and a fibrous material. The fibrous material—fibers—are typically responsible for the strength of the composite, in addition to any other properties they contribute. The matrix, formed from a polymer resin, surrounds and supports the fibers, maintaining their relative positions and preventing abrasion and environmental attack thereof. The combination of the fibers and resin is synergistic, and the resulting properties are to some extent unpredictable.

Current methods for producing large quantities of fiber-composite parts typically involve "lay-up" of sheets of material. Lay-up is costly as well as limiting in terms of an inability to align fibers independently within a sheet of material. The alignment of fibers within composites along directions of principal stress is an important consideration in deriving the maximum performance for a composite part.

The art would therefore benefit from a way to efficiently and cost-effectively produce high-volume low-cost fiber-composite parts wherein the fibers can be aligned for maximum part performance.

SUMMARY

The present invention provides a way to expedite the production of high-volume, fiber-composite parts having appropriately aligned fibers.

The properties of a fiber-composite part are a function of, among many other parameters, the type, geometry, and relative orientation of its constituent materials. Consequently, having an ability to manipulate these constituent materials in a manner that is very accurate and efficient facilitates a reduction in the overall cost of the final part while, at the same time, maintains the desired performance characteristics.

In accordance with the present teachings, such manipulation is accomplished by altering the feedstock—typically a bundle of unidirectional, same length, continuous fibers that have been pre-impregnated with resin, such as tow-preg—so that it becomes relatively easier to bend than unaltered feedstock.

In the illustrative embodiment, the altered feedstock, hereinafter referred to as a "non-standard, resin-infused fiber bundle," includes localized regions of fibers having a sub-nominal amount of polymer resin positioned along its length. These regions function as "bending regions," where the non-standard resin-infused fiber bundle can be readily deformed at these locations by virtue of their reduced amount of resin. These bending regions segregate the non-standard resin-infused fiber bundle into what is, effectively, discrete (smaller) segments of (standard) resin-infused fiber bundle. The non-standard resin-infused fiber bundle optionally includes features formed on the polymer resin, typically at the ends of the discrete segments, that can aid in creating a desired preform geometry.

The ability to easily manipulate the feedstock via the bending regions is useful for creating specific size and shaped pieces of the feedstock, referred to herein as "preforms." A number of identical preforms will often be used to mold a fiber composite part. Consequently, in accordance with the illustrative embodiment, the non-standard resin-infused fiber bundle will typically include repeating lengths or sections of what are effectively nascent preforms. In an embodiment in which a plurality of identical preforms are required, each section—each nascent preform—will have the same "pattern" of bending regions and discrete segments of resin-infused fiber bundles.

The bending regions also facilitate the creation of preform charges (bound arrangements of preforms). Ultimately, the preforms and/or preform charges are placed in a mold for the creation of a part by compression molding.

An important parameter of the non-standard, resin-infused fiber bundle is the distance between neighboring bending regions, which define the length of the discrete segments of resin-infused fiber bundle in each nascent preform. The discrete segments need not have the same length. Those lengths, and bend angles at the bending regions, dictate the geometry of the preforms and preform charges being formed. Note that it is the geometry of the preforms/preform charge(s) that is first determined, based on a desired fiber alignment in the part, as required to meet performance specifications based on the anticipated in-use loading conditions. In other words, once the geometry of the preforms/preform charge(s) is established, then the non-standard, resin-infused fiber bundle is created.

In some embodiments, the invention provides a non-standard bundle of unidirectional, same-length, continuous fibers infused with resin ("non-standard, resin-infused fiber bundle"), wherein the non-standard resin-infused fiber bundle comprises plural sections, some of the plural sections having a first length, the sections having a first length include a first group thereof, each section in the first group defining a first nascent preform having m bending regions, wherein m is a non-zero integer, the m bending regions segregating each section in the first group into m+1 segments of resin-infused fiber bundle, wherein:
  each of the m+1 segments includes a nominal amount of the resin, and
  each of the m bending regions includes less than the nominal amount of the resin.

In some embodiments, the invention provides a preform comprising a bundle of unidirectional, same-length, continuous fibers infused with resin, wherein the preform comprises m bending regions, wherein m is a non-zero integer, the m bending regions segregating the preform into m+1 segments of resin-infused fiber bundle, wherein:
  each of the m+1 segments includes a nominal amount of the resin, and
  each of the m bending regions includes less than the nominal amount of the resin.

In some embodiments, the invention provides a method comprising:
  determining a geometry of a preform for a part being fabricated by compression molding; and forming a non-standard bundle of unidirectional, same-length, continuous fibers infused with resin ("non-standard, resin-infused fiber bundle"), wherein the non-standard, resin-infused fiber bundle comprises plural sections, each section defining a preform in a nascent state, each section having m bending regions, wherein m is a non-zero integer, the m bending regions segregating each first length into m+1 segments of resin-infused fiber bundle, wherein:

a length of each of the m+1 segments is based on the geometry of the preform, each of the m+1 segments includes a nominal amount of the resin, and each of the m bending regions includes less than the nominal amount of the resin.

In some embodiments, the invention provides a method comprising:

positioning plural preforms adjacent to one another, each preform comprising a bundle of unidirectional, same-length, continuous fibers infused with resin, wherein the preform comprises at least one bending region that segregates the preform into a first segment and a second segment of resin-infused fiber bundle, wherein the first and second segments include a nominal amount of the resin, and the bending region includes less than the nominal amount of the resin;

tacking the plural preforms together at the respective first segments thereof;

bending the preforms, collectively, at the bending region; and one of either:
(a) tacking the plural preforms together at the respective second segments thereof, and
(b) applying a material to the bend region to set to the bend angle.

DETAILED DESCRIPTION

Definitions. The following terms are defined for use in this description and the appended claims:

"Tow" means a bundle of fibers (i.e., fiber bundle), and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" means a fiber bundle (i.e., a tow) that is impregnated with resin.

"Preform" means a segment of plural, unidirectionally aligned, same-length fibers. The segment is cut to a specific length, often from a long length of towpreg, and, in many cases, will be shaped (e.g., bent, twisted, etc.) to a specific form, as appropriate for the specific part being molded. For the purposes of this disclosure and the appended claims, preforms further include one or more bending regions, as described later herein. The cross section of the preform, and the fiber bundle from which it is sourced typically has an aspect ratio (width-to-thickness) of between about 0.25 to about 6. Nearly all fibers in a given preform have the same length (i.e., the length of the preform) and, as previously noted, are unidirectionally aligned. Applicant's use of the term "preform" means a fiber-bundle-based preform, and explicitly excludes any size of shaped pieces of: (i) tape (typically having an aspect ratio—cross section, as above—of between about 10 to about 30), (ii) sheets of fiber, and (iii) laminates.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of preforms that are at least loosely bound together so as to maintain their position relative to one another. Preform charges can contain a minor amount of fiber in form factors other than fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas a compression-molding process is typically conducted at about 150-300 psi, the downward pressure applied to the preforms to create a preform charge in accordance with the present teachings is typically in the range of about 10 psi to about 100 psi. Thus, voids remain in a preform charge, and, as such, the preform charge cannot be used as a finished part.

"About" or "Substantially" means +/− 20% with respect to a stated figure or nominal value.

Unless otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/− 20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

Embodiments of the invention apply to compression-molding processes. Compression molding involves the application of heat and pressure to feed constituents for a period of time. The applied pressure is usually in the range of about 100 psi to about 300 psi, and temperature, which is a function of the particular resin being used, is typically in the range of about 150° C. to about 400° C. Once the applied heat has increased the temperature of the resin above its melt temperature, it is no longer solid. The resin will then conform to the mold geometry via the applied pressure. Elevated pressure and temperature are typically maintained for a few minutes. Thereafter, the mold is removed from the source of pressure and is cooled. Once cooled, the finished part is removed from the mold.

In applicant's compression molding processes, the feed constituents are typically "preforms" and/or "preform charge(s)." Preforms are segments sourced from bundles of unidirectional, same-length, continuous, fiber (e.g., towpreg, etc.), and further modified as described herein. Preforms thus include fiber and resin. Preform charges are assemblages of preforms.

In accordance with the illustrative embodiment, a resin-infused fiber bundle from which preforms are formed is altered. More particularly, such an altered bundle, which is referred to herein as a "non-standard resin-infused fiber bundle," is altered by the incorporation of "bending regions," as described in more detail later in this specification. The bending regions, which have a less-than-nominal amount of resin, segregate what would otherwise be a length of a conventional resin-infused fiber bundle into discrete segments. Note, however, that in such a non-standard resin-infused fiber bundle, the fibers remain continuous through the bending region(s) and the segments. And once the non-standard resin fiber bundle is cut to create preforms, the fibers within any given preform remain continuous through the bending region(s) and the segments. Both the bending regions and the discrete segments facilitate the shaping of preforms and preform charges, as dictated by a desired fiber alignment in a part being formed.

In a composite material, the matrix (resin) possesses isotropic material properties, whereas the fibers present anisotropic properties that largely define the performance of the part. By controlling the orientation of the fibers, one skilled in the art can improve aspects of the performance of a composite part. For example, aligning fibers along the anticipated in-use principal stress vector(s) of the part maximizes structural performance of the part.

In applicant's compression-molding processes, the alignment of fibers in the mold cavity, and in the final part, corresponds primarily to the geometry of the preform(s)/preform-charge(s) and their placement in the mold cavity. Thus, by determining/estimating the principal in-use stress vectors of a part, a desired fiber alignment is determined. Based on the desired fiber alignment, and part geometry, appropriate preform/preform-charge geometry is established. Having established the geometry, the length of the discrete segments of the non-standard resin-infused fiber bundle, and hence the locations of the bending regions, are determined to satisfy the requisite geometries.

In some alternative embodiments, the feedstock can be resin-impregnated tape; however, resin-impregnated tape is not form a "preform," as that term is defined for use herein and in the appended claims.

Fibers suitable for use in conjunction with the invention include any type of fiber that can withstand the operating temperatures of the molding process being used, such as the compression molding process. Typically, that temperature is a function of resin selection. Examples of suitable fiber include, without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Furthermore, carbon nanotubes can be used.

Each individual fiber can be formed of a single material or multiple materials (such as from the materials listed above), or can itself be a composite. For example, an individual fiber can comprise a core (of a first material) that is coated with a second material, such as an electrically conductive material, an electrically insulating material, a thermally conductive material, or a thermally insulating material. Moreover, individual fibers can include an exterior coating such as, without limitation, sizing, to facilitate processing, adhesion of binder, minimize self-adhesion of fiber.

The fibers within the towpreg can have any diameter, which is typically but not necessarily in a range of 1 to 100 microns. The cross-sectional shape of the fiber can be circular, oval, trilobal, polygonal, etc.

Any thermoplastic resin can be used in conjunction with embodiments of the invention. Resins suitable for use in conjunction with embodiments of the invention include any thermoplastic, such as, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), thermoplastic polyurethane (TPU), polyvinyl chloride (PVC). Additionally, thermoset resins can be used in conjunction with the embodiments of the invention. Exemplary thermosets include, without limitation, polyester, thermoset polyurethane, epoxy, polyimides, and vinyl ester.

Figure 1:
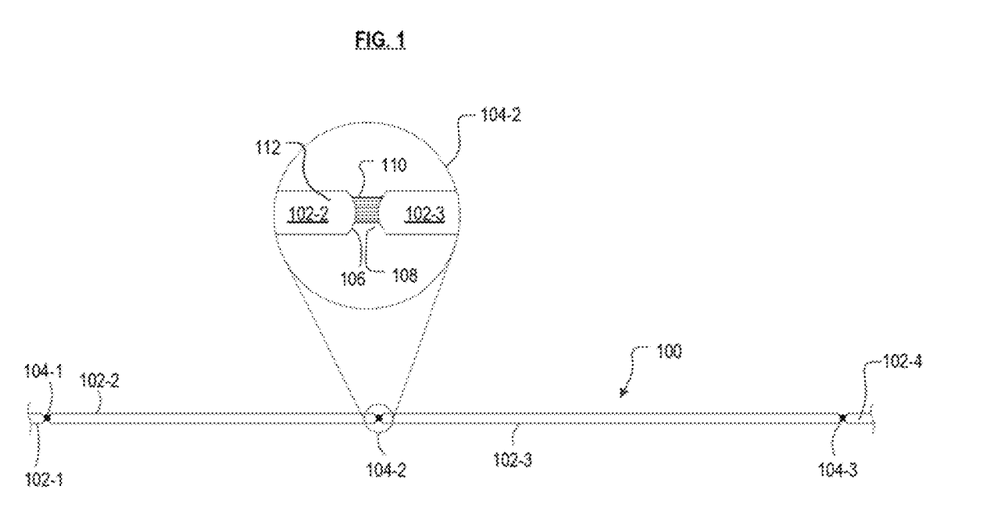
FIG. 1 depicts non-standard, resin-infused fiber bundle in accordance with the illustrative embodiment.

FIG. 1 depicts non-standard, resin-infused fiber bundle 100. In accordance with the illustrative embodiment of the present invention, non-standard, resin-infused fiber bundle 100 is segregated into a plurality of discrete segments, such as the four segments 102-$i$, i=1,4 (collectively "segments 102") depicted in FIG. 1 (only a small portion of each of segments 102-1 and 102-4 is shown). Each segment 102-$i$ is representative of a short segment of a conventional resin-infused fiber bundle (e.g., towpreg, etc.) wherein the fibers in that segment are impregnated with a nominal amount of resin. It is to be understood that in accordance with the present teachings, a length of non-standard, resin-infused fiber bundle can include fewer than, or more than, the four segments 102 depicted in FIG. 1.

Each segment 102-*i* of non-standard, resin-infused fiber bundle 100 is separated from an adjacent segment by a "bending region," such as bending regions 104-*j*, j=1,3 (collectively "bending regions 104"). The fibers running through non-standard, resin-infused fiber bundle 100 are continuous, and, in some embodiments, the portion of each of the fibers in a bending region 104-*j* are only partially impregnated with resin (i.e., includes less than the nominal amount of resin found elsewhere throughout the towpreg). For example, in the enlargement of bending region 104-2 depicted in FIG. 1, less resin 112 is present around fibers 110 than in the adjacent segments 102-2 and 102-3 of towpreg.

Segment 102-*i* is defined as the region between two neighboring bending regions. The length of segment 10-*i* is defined by the distance between the two neighboring bending regions. For example, segment 102-2 is defined between bending regions 104-1 and 104-2, and its length is the distance between such bending regions. Likewise, for segment 102-3 and bending regions 104-2 and 104-3.

By virtue of the sub-nominal amount of resin in each bending region 104-*j*, each such region enables the orientation of neighboring segments to be readily altered from their otherwise linear relationship with respect to one another. That permits non-standard, resin-infused fiber bundle 100 to be bent into a shape. As appropriate, bending of one or more bending regions 104-*j* may be performed before or after non-standard, resin-infused fiber bundle 100 is cut to create individual "preforms."

Many performs may be required to mold a given part. Thus, a non-standard, resin-infused fiber bundle in accordance with the present teachings may include many "sections," each of which is effectively a nascent preform. As such, in FIG. 1, the four segments 102 and three bending regions 104 may represent a single nascent preform, wherein many more additional sections, some of which may be identical to the section shown in FIG. 1, and some not, may be present in a non-standard, resin-infused fiber bundle.

A non-standard, resin-infused fiber bundle may therefore include plural sections. Some of the sections may be identical to other sections. Some of the sections may have the same overall length as other sections, but the specific placement and/or number of bending regions in such sections may differ. And some of the sections may have a different overall length than other of the sections. Every section will have one more segment than bending regions. In other words, in a section, if n is the number of bending regions, then n+1 is the number of segments.

In some embodiments, it is desirable to control the geometry where a discrete segment interfaces with a bending region in order to influence/facilitate preform shapes. For example, in FIG. 1, surfaces 106 and 108 enable respective neighboring segments 102-2 and 102-3 to easily form an angled bend.

Those familiar with high-volume manufacturing will understand that process energy, steps, and efficiencies are critical in order to be competitive in market sectors that demand low costs (e.g., consumer electronics, automotive, etc.). It is therefore desirable to minimize both material and processing steps from raw feedstock to finished product. By altering a conventional feedstock (such as towpreg), or otherwise creating a resin-infused fiber-bundle feedstock consistent with the present teachings, necessary steps that would otherwise be performed downstream can be eliminated or greatly simplified.

In particular, the nominal amount of resin in towpreg would require a softening step before it can be readily bent. Consequently, the bending step for creating a preform formerly required applicant to perform the sub-operations of heating, then bending, then cooling. However, by virtue of the sub-nominal amount of resin present at the bending regions, bending is reduced to a simple manipulation operation. Such manipulation can be performed by a much less complicated machine, such as via a general-use material-handling robot, than was hitherto required for the bending step. Thus, in some embodiments, the bending machine is itself eliminated, replaced by a mechanism/device that is simpler, less expensive, and operates much more quickly.

As modified herein to include bending regions, the feedstock can still be handled efficiently by means of a conventional tensioning arrangement (e.g., rollers, spools, etc.).

The non-standard, resin-infused fiber bundle can be readily manipulated, such as by gripping, bending, rotating, trimming, etc., to create a preform having a desired size and shape. Alternatively, the non-standard feedstock could be manipulated directly into a mold cavity for final molding.

A non-standard, resin-infused fiber bundle in accordance with the present teachings can be easily and efficiently created by controlling the travel rates of the feedstock (increasing the travel rate of fiber through resin during impregnation can decrease the amount of resin per unit length of fiber tow), in conjunction with the following approaches.

The bending regions may be formed in situ with, for example, an impregnation process die (not pictured) by means of opening and closing an iris, or other annulus, appropriately timed with the pull rate of the fiber so as to achieve a desired spacing between bending regions. The bending regions may also serve as a means (e.g., such as based on their length, etc.) to optically encode the feedstock for means of control and manipulation. Thus, a bending region having a certain length can be indicative of a process parameter. The length can be determined optically.

Alternatively, the bending regions may be formed via subtractive processing, such as by removing a portion of the polymeric resin at discrete regions along the length of conventional towpreg. This may be accomplished via energy in the form of radiation, such as coherent light (laser), or thermal energy from a controlled ignition and fuel source as the material is fed through the energy field.

The amount of resin in a fiber/resin feedstock is typically expressed in terms of a "fiber-to-resin" ratio. For many parts formed using resin-impregnated fiber bundles, per applicant's compression-molding processes, a fiber-to-resin volume ratio in a range of about 60:40 to about 40:60 is typical. Using a 60:40 fiber-to-resin volume ratio as the basis (in this disclosure and the appended claims) for the "nominal" amount of resin, in some embodiments, the bending regions will contain an amount of resin that is in a range of about 10 to about 30 percent less than the nominal amount. In some other embodiments, the bending regions will have an amount of resin that is in a range of about 20 to about 40 percent less than the nominal amount. In some additional embodiments, the bending regions will have an amount of resin that is in a range of about 30 to about 50 percent less than the nominal amount of resin, and in yet some further embodiments, the bending regions will have an amount of resin that is in a range of about 40 to about 70 percent less than the nominal amount of resin in the bundles of resin-impregnated fibers. Depending on the use case and resin type (those with a relatively higher melt flow), in some embodiments, there is no resin in the bending region.

Figure 2:
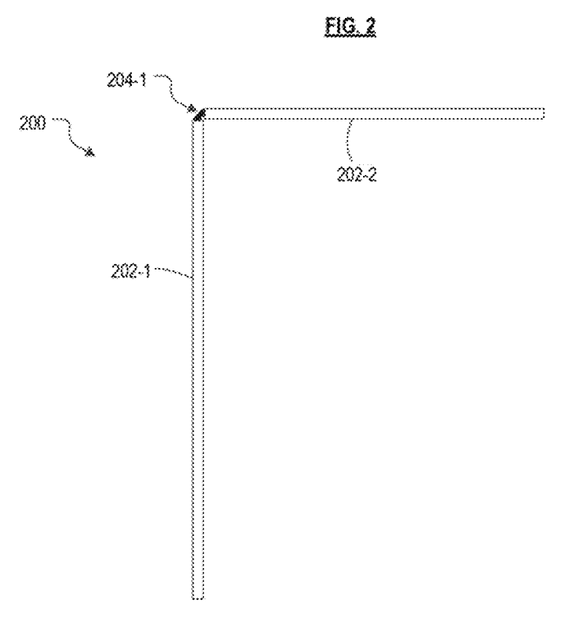
FIG. 2 depicts an embodiment of a preform formed from non-standard, resin-infused fiber bundle, wherein the preform includes one bend.

FIG. 2 depicts preform 200 with two discrete segments 202-1 and 202-2. In this embodiment, segment 202-1 is longer than segment 202-2. Bending region 204-2 enables a ninety-degree bend between segments.

Figure 3:
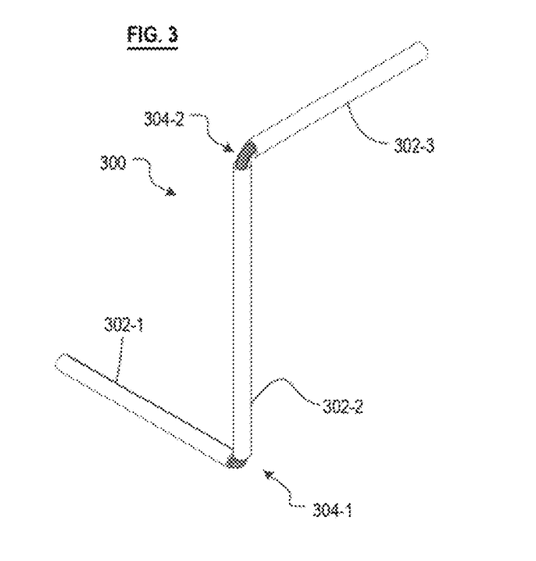
FIG. 3 depicts an embodiment of a preform formed from non-standard, resin-infused fiber bundle, wherein the preform includes two bends that are out-of-plane with respect to one another.

FIG. 3 depicts 3D preform 300 with three discrete segments 302-1, 302-2, and 302-3, separated by bending regions 304-1 and 304-2. The long axis of each segment 302-*i* is normal to each other segment such that the complete preform geometry is three dimensional. Preform 300 shows discrete segments oriented ninety degrees with respect to each other, but in some other embodiments (not depicted), preforms incorporate bend angles greater than ninety degrees, less than ninety degrees, or both.

Applicant has disclosed the use of one or more "preform charges" for compression molding. A preform charge typically comprises two or more fiber-bundle-based preforms that are tacked (joined) together. The preform charge, which is typically a three-dimensional arrangement of preforms, is usually created in a fixture separate from the mold, and which is dedicated to and specifically designed for that purpose. To create a preform charge, one or more preforms are placed (either automatically or by hand) in a preform-charge fixture. By virtue of the configuration of the fixture, the preforms are organized into a specific geometry and then tacked together. Tacking can be performed by heating the preforms and then pressing them together. Other techniques for tacking/joining include ultrasonic welding, friction welding, lasers, heat lamps, chemical adhesives, and mechanical methods such as lashing.

After tacking, the preform charge is not fully consolidated. However, once the preforms are joined, they will not move, thereby maintaining the desired geometry and the specific alignment of each preform in the assemblage. The shape of the preform charge usually mirrors that of an intended part, or a portion of it. See, e.g., Publ. Pat. App. US2020/0114596 and U.S. patent application Ser. No. 16/877,236, incorporated herein by reference.

Figure 4:
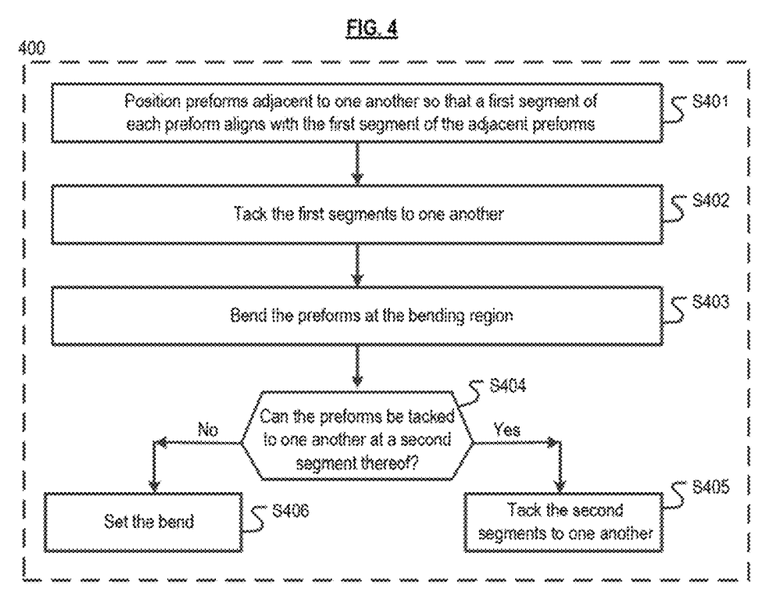
FIG. 4 depicts a flow chart of a method in accordance with the illustrative embodiment for forming a preform charge from non-standard, resin-infused fiber bundle.

In accordance with the present teachings, and unlike the methods referenced above, preform charges in accordance with the present teachings can be created via method 400, as depicted in FIG. 4.

In accordance operation S401 of method 400, unbent (linear) preforms are positioned adjacent to one another so that a first segment of each preform aligns with the first segment of adjacent preforms. This applies to preforms sourced from non-standard, resin-infused fiber bundles as described herein, and wherein the preforms have at least two segments separated by a bending region. This operation can be performed, for example, if the first segment is linear, or has any form in which an identical segment in adjacent preforms can be aligned therewith, without tension, and wherein substantially all portions of the adjacent segments abut one another. Although this operation refers to "preforms," the operation can be performed on lengths of non-standard, resin-infused fiber bundle that have not, as of yet, been cut to form preforms, proper.

In operation S402, the first segment of the plurality of preforms are tacked to one another, such as via any of the techniques mentioned above. In embodiments in which the resin used is a thermoplastic, the portions of the preforms are tacked together by heating them and applying at least gentle pressure to urge the portions into abutment with one another. The preforms remain tacked to one another when cooled. The temperature to which the bundles is heated is a function of the resin being used; it is within the capabilities of those skilled in the art to select a temperature for tacking as a function of resin type. If the resin is a thermoset, rather than a thermoplastic, the material will be tacky such that mild pressure alone (no heat) will typically be sufficient to tack the individual portions of the preforms together to create a preform charge.

The preforms are then bent, collectively, at operation S403. This operation can be performed, for example, via a general-use material-handling robot. In most embodiments, heating is not required to create the bend, as a consequence of the presence of a bending region.

After bending the preforms, query, at operation S404, whether the preforms can be tacked to one another at a second segment thereof. If they can, then at operation S405, the second segment of each preform is tacked to one another, again using any convenient method, as described above, and with appropriate heating if the resin is a thermoplastic.

If the preforms cannot be tacked to one another at a second segment thereof, then, at operation 406, the bend formed at operation S403 is "set." This is accomplished by applying, at the bending region, a resin (typically, but not necessarily, the same resin as in the preforms), chemical adhesive, or any other material that is capable of preventing the fibers in the bending region from springing back to a linear form. Note that the alternative operation (i.e., tacking the preforms together at a second segment) functions to prevent spring back.

Figure 5A:
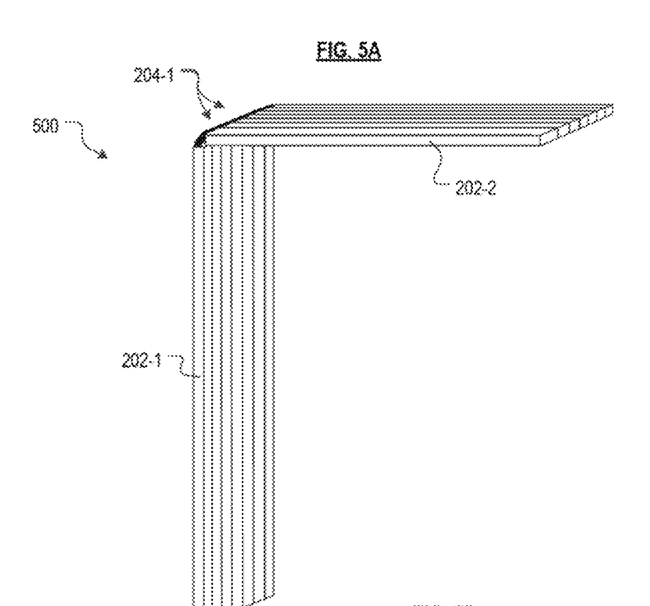
FIG. 5A depicts a preform charge formed in accordance with the method of FIG. 4.
Figure 5B:
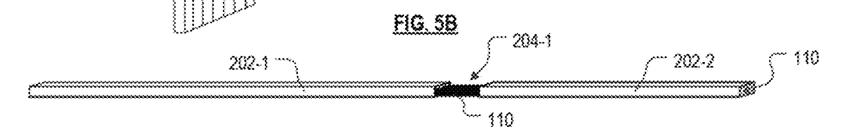
FIG. 5B depicts a preform formed from non-standard, resin-infused fiber bundle for use in creating the preform charge of FIG. 5A.

FIG. 5A depicts preform charge 500, which can be made in accordance with method 400 discussed above. Preform charge 500 comprises a plurality of individual preforms that have been tacked together in accordance with method 400. FIG. 5B depicts an example of a preform for use in forming preform charge 500, prior to bending. The preform includes two linear segments 202-1 and 202-2 separated by bending region 204-1. Fibers 110 extend from one end of the preform to the other end (i.e., are continuous with respect to the preform).

To form preform charge 500, the individual preforms are aligned with one another, and then tacked together at either segments 202-1 or segments 202-2. The preforms are then collectively bent at bending region 204-1, which, in this embodiment, creates a ninety-degree bend. The other set of segments, for example 202-2, will be aligned by virtue of the alignment and the prior tacking of segments 202-1 to one another. Segments 202-2 are then tacked to one another.

It is notable that although segment 201-2 and 201-2 are linear, such linearity is not required for practicing method 400. As long as at least one of the two segments adjacent a bending region has a form to which an identical segment in adjacent preforms can be aligned, and abut one another without any significant tension, method 400 can be used to create a preform charge.

In some alternative embodiments, preform charges can be formed by wrapping, tying, braiding, etc., two or more preforms together at respective bending regions 104-*j*. In such an embodiment, the wrapping, etc., of plural preforms at the bending regions holds the preform charge together in a desired geometry.

Preform charges can have a 2D geometry (e.g., a plurality of unbent preforms positioned side-by-side, such as to form a sheet, etc.). Preform charges can also have a 3D geometry, which can be formed from 1D (unbent) preforms, 2D (in-plane bends) preforms, or 3D (out-of-plane bends) preforms.

Moreover, discrete portions of towpreg/preforms/preform charges may also nest or otherwise conform to mold cavity regions for registration and proper positioning/location.

Depending on the specifics of a mold cavity, the preforms, etc., used may have different cross-sectional sizes and/or shapes.

It was previously disclosed that preform geometry and preform-charge geometry is based on a desired fiber alignment. For a relatively simple part, it is within the capabilities of those skilled in the art to determine a desired fiber alignment to satisfy part requirements based on anticipated loading conditions. That is, based on their experience, those skilled in the art will be able to estimate the anticipated principle stress vectors arising in an in-use part, and know where in the part the fibers should be positioned, and how they should ideally be aligned, to provide the requisite part performance.

For more complicated scenarios, either as consequence of part geometry or the forces to which the part is subjected in use, or both, the anticipated principle stress vectors can be determined, for example, using the techniques disclosed in Pub. Pat. App. US2020/00130297, incorporated by reference herein. Briefly, that application discloses: (a) developing a description of the part's geometry, (b) developing a description of the part's anticipated loading conditions, and (c) performing a finite element analysis (FEA) on the part geometry to calculate the stress under load. This results in a three-dimensional principal stress contour map for the interior of the component. The referenced publication discloses that by considering the orthotropic material properties at hand, a preform "map" (i.e., a preform layout/arrangement) can be developed from the principal stress contour map, such as by using a technique that determines "low-cost" routing. See also, U.S. patent application Ser. No. 16/811,537.

Regarding step (c) above, for every point in a given part with a given load case, there exists a stress state with six stresses aligned with the x, y, z axes and the shear stresses between them. If one rotates that stress state such that the shear stresses go to zero, the result is three, mutually orthogonal principal stresses. Each principle stress has a magnitude (which can be zero) and a direction; hence "stress vector." The directions are orthogonal to one another. This stress tensor can rotate and change in magnitude from one element (in the finite element analysis) to the next.

A determination as to the nature of the fiber alignment in any particular region considers the principal stress tensors in that region. If the maximum or minimum principal stress is significantly larger than the other two, and follows a straight line or curves in a certain direction, fibers (in the part) can be aligned therewith, with few if any fibers being aligned in other directions ("off-axis" directions). If, on the other hand, a region has two or more principal stresses with substantially similar magnitudes, then, ideally, fibers should be aligned in multiple directions (i.e., the directions of the principal stresses) or randomized in an attempt to address the plural directions of such stresses.

Figure 6:
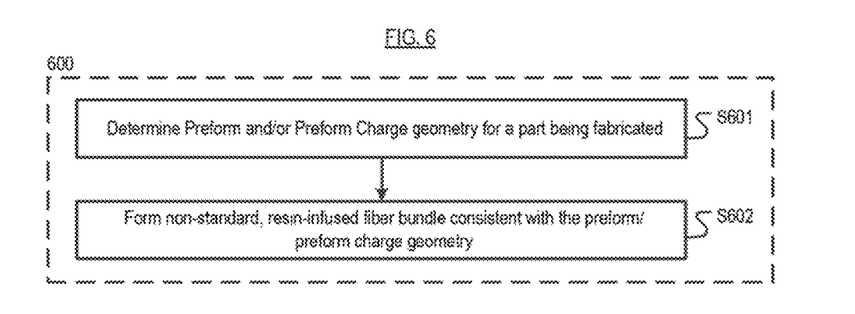
FIG. 6 depicts a method for forming a non-standard resin-infused fiber bundle in accordance with the present teachings.

FIG. 6 depicts method 600 for forming non-standard, resin-infused fiber bundle in accordance with the present teachings. In operation S601, preform/preform charge geometry for a part to be fabricated is determined. The determination is performed as discussed above. The geometry includes the shape/orientation of preforms/preform charge(s) as well as the dimensions thereof. Once the specifics of the preforms/preform charge(s) are known, non-standard, resin-infused fiber bundle is formed consistent with such specifics, per operation S602. That is, to the extent that the preforms/preform charge(s) have a shape other than linear, bending regions are formed at appropriate locations along the non-standard, resin-infused fiber bundle so that segments of the requisite length are formed. Since the non-standard, resin-infused fiber bundle is likely the source for many such preforms, the pattern of bending region(s) and segments required for a single preform is repeated along its length.

As previously disclosed, the non-standard, resin-infused fiber bundle can be formed by forming a bundle of resin-impregnated fibers, wherein less than the nominal amount of resin is deposited at the prescribed locations to create the bending regions. Alternatively, resin can be removed from a previously formed length of towpreg, etc.

It is to be understood that the disclosure describes a few embodiments and that many variations of the invention can easily be devised by those skilled in the art after reading this disclosure and that the scope of the present invention is to be determined by the following claims.

What is claimed:

1. A non-standard bundle of unidirectional, same-length, continuous fibers infused with resin ("non-standard, resin-infused fiber bundle"), wherein the non-standard resin-infused fiber bundle comprises plural sections, some of the plural sections having a first length, the sections having a first length include a first group thereof, each section in the first group defines a first nascent preform having m bending regions, wherein m is a non-zero integer, the m bending regions segregating each section in the first group into m+1 segments of resin-infused fiber bundle, wherein:
   each of the m+1 segments includes a nominal amount of the resin, and
   each of the m bending regions includes less than the nominal amount of the resin.

2. The non-standard, resin-infused fiber bundle of claim 1 wherein m=1 and the m+1 segments have identical lengths.

3. The non-standard, resin-infused fiber bundle of claim 1 wherein m=1 and the m+1 segments have unequal lengths.

4. The non-standard, resin-infused fiber bundle of claim 1 wherein a length of each of the m+1 segments is based on a first preform geometry, wherein the first preform geometry is based on a first desired fiber alignment within a part.

5. The non-standard, resin-infused fiber bundle of claim 1 wherein the sections having the first length include a second group thereof, each section in the second group defines a second nascent preform having n bending regions, wherein n is a non-zero integer, the n bending regions segregating each first length into n+1 segments of resin-infused fiber bundle, wherein:
   each of the n+1 segments includes a nominal amount of the resin,
   each of the n bending regions includes less than the nominal amount of the resin, and
   the second group differs from the first grouping by a characteristic selected from the group consisting of n not being equal to m, and a length of the n+1 segments not being equal to a length of the m+1 segments.

6. The non-standard, resin-infused fiber bundle of claim 1 wherein the plural sections include sections having a second length, each section having the second length defining a second nascent preform having n bending regions, wherein n is a non-zero integer, the n bending regions segregating each second length into n+1 segments of resin-infused fiber bundle, wherein:
   each of the n+1 segments includes a nominal amount of the resin,
   each of the n bending regions includes less than the nominal amount of the resin, and
   the second lengths are not equal to the first lengths.

7. The non-standard, resin-infused fiber bundle of claim 1 comprises towpreg.

8. The non-standard, resin-infused fiber bundle of claim 1 wherein opposing ends of two segments that are separated by a single bending region have a shape that facilitates bending or creation of a desired geometry at the single bending region.

9. The non-standard, resin-infused fiber bundle of claim 1 wherein at least one of the bending regions has a length that is indicative of a process parameter for processing the resin-infused fiber bundle.

10. The non-standard, resin-infused fiber bundle of claim 1 wherein after separation of the sections in the first group from one another, each first nascent preform defines a first preform.

11. The non-standard, resin-infused fiber bundle of claim 10 wherein at least one first preform is non-linear.

12. The non-standard, resin-infused fiber bundle of claim 11 wherein a long axis of all of the m+1 segments in the at least one first preforms falls in the same plane.

13. The non-standard, resin-infused fiber bundle of claim 11 wherein m+1 is at least 3, and wherein the m+1 segments do not fall in a single plane, the at least one first preform thereby having a three-dimensional geometry.

14. The non-standard, resin-infused fiber bundle of claim 10 wherein at least some of the m+1 segments in at least one first preform are linear.

15. The non-standard, resin-infused fiber bundle of claim 10 wherein at least some of the m+1 segments in at least one first preform are nonlinear.

16. The non-standard, resin-infused fiber bundle of claim 10 wherein, in at least one first preform, a bend angle between at least two of the m+1 segments that are separated by a single bending region is greater than 0 degrees and less than 180 degrees.

17. The non-standard, resin-infused fiber bundle of claim 10 wherein, in at least one first preform, opposing ends of two segments that are separated by a single bending region have a shape that facilitates bending or creation of a desired geometry at the single bending region.

* * * * *